United States Patent
Campbell et al.

(10) Patent No.: US 6,720,379 B1
(45) Date of Patent: Apr. 13, 2004

(54) ELECTROSTATIC DISSIPATIVE PLASTICS ADAPTED PARTICULARLY FOR USE AT ELEVATED TEMPERATURES

(76) Inventors: Richard W. Campbell, 12 Buck Run Rd., Reinholds, PA (US) 17569; Chi Way Lau, 11800 Grant Rd., Apt. 2008, Cypress, TX (US) 77429

( * ) Notice: Subject to any disclaimer, the term of this patent is extended or adjusted under 35 U.S.C. 154(b) by 0 days.

(21) Appl. No.: 09/448,666

(22) Filed: Nov. 24, 1999

Related U.S. Application Data

(60) Provisional application No. 60/109,657, filed on Nov. 24, 1998.

(51) Int. Cl.$^7$ ................................................. C08K 3/04
(52) U.S. Cl. ........................ 524/496; 524/495; 252/511
(58) Field of Search ................................. 252/502, 511, 252/519; 264/105; 524/543, 544, 600, 606, 847, 495, 496

(56) References Cited

U.S. PATENT DOCUMENTS

| | | | | |
|---|---|---|---|---|
| 4,285,796 A | * | 8/1981 | Stoner et al. | 204/290 |
| 4,337,138 A | * | 6/1982 | Stoner et al. | 204/290 |
| 5,635,252 A | * | 6/1997 | Fraser, Jr. et al. | 427/430.1 |
| 5,820,788 A | * | 10/1998 | Smith | 252/511 |
| 6,103,818 A | * | 8/2000 | Morita et al. | 524/606 |

* cited by examiner

*Primary Examiner*—Edward J. Cain
*Assistant Examiner*—K. W. Lee
(74) *Attorney, Agent, or Firm*—Pillsbury Winthrop LLP

(57) ABSTRACT

Resins suitable for use in compression molding processes are prepared by mixing between about 10 and 30 weight % of chopped partially carbonized fibers, i.e. fibers having a carbon content of between about 70 to 95% by weight and an average size of about 100 $\mu$m, with compression grade molding resins. Typically the compression grade molding resins are about 100 $\mu$m When chopped carbon fibers of reduced conductivity are used the curve obtained by plotting the resistivity against the concentration of carbon fibers is less steep in the critical regions of interest (i.e., between about $10^{10}$ and $10^{12}$ and between about $10^6$ and $10^9$) than is the curve obtained when high conductivity fibers are used. It has been observed that even if some dielectric breakdown occurs, the connected fibers are not as conductive and the effect has been found not to be as significant as is the case with the usual carbon fibers which have maximized conductivity.

15 Claims, No Drawings

ELECTROSTATIC DISSIPATIVE PLASTICS ADAPTED PARTICULARLY FOR USE AT ELEVATED TEMPERATURES

HISTORY OF THE APPLICATION

This application is based upon and claims priority from U.S. Provisional Patent Application Ser. No. 60/109,657 filed on Nov. 24, 1998.

TECHNICAL FIELD

This invention relates to electrostatic dissipative plastics and, more particularly, to electrostatic dissipative plastics that retain useful physical, chemical and electrical properties at elevated temperatures to at least 160° C. The invention has particular utility in the manufacture and use of electronic components and electronic devices though it is to be understood that it is not intended that the invention be so limited.

Definitions For purposes of this specification and the appended claims, the following terms are defined as follows:

a. Antistatic Agent. A material that can increase the conductivity of a plastic. It may be incorporated into a plastic or it may be applied as a surface coating or treatment.

b. Resistivity. Resistivity, the inverse of electrical conductivity, is a measure of the resistance to the flow of an electric current and is measured either as a surface or a volume phenomenon. Surface resistivity is expressed in ohms per square ($\Omega/\square$) and is measured at the surface of a material, usually at room temperature. Information detailing methods for quantifying surface resistivity is given in ASTM D257 and EOS/ESD S11.11.

c. Conductor. A material that has a surface resistivity less than about $10^5$ $\Omega/\square$.

d. Insulator. A material that has a surface resistivity greater than about $10^{13}$ $\Omega/\square$.

e. Electrostatic Dissipative Material (ESD). A material that has a surface resistivity between that of a conductor and an insulator, usually defined as between about $10^6$ and $10^{12}$ $\Omega/\square$.

BACKGROUND ART

Every major plastic resin is, in its natural state, an electric insulator and many have a significant tendency to accumulate static electric charges. The ability of plastics to generate static electric charges and accumulate them variously due to the relative movement of one piece to another, separation of surfaces and the turbulent flow of contaminates in the air is well recognized. As an example, it is the presence of static electrical charges on sheets of thermoplastic film, such as the familiar food wraps, that cause the sheets to stick to each other.

The increased complexity and sensitivity of microelectronic devices makes the control of static discharge of particular concern in the electronic industry. There are many instances in the manufacture and use of electronic components and electronic devices in which an excessive accumulation of static charges can range from being a general nuisance to being a disabling or destructive force. Even a low voltage discharge may cause damage to sensitive devices. The need to control static charge buildup by the controlled dissipation may require the total assembly environment to be constructed of electrostatic dissipative materials. It may also require that materials used in storing, handling and shipping electronic devices be made from electrostatic dissipative materials. Tote boxes, strapping tape and shipping containers are examples.

The prevention of the buildup of static electrical charges which accumulate on plastics can be controlled through the use of several kinds of antistatic agents (antistats) which variously are incorporated into the plastic as fillers or applied to the plastic as a surface coating. Most commonly, the electrostatic dissipative technologies include those that make use of hygroscopic agents, those that make use of conductive particulates, those that make use of conductive fibers, and those that make use of low molecular weight additives and conductive polymers. While the use of any of these techniques can be helpful in alleviating electrostatic build-up, they are all subject to inherent limitations.

Surface antistat agents are not always reliable and can be inconsistent in operation. Some of the surface antistats do not adhere to a surface with sufficient tenacity to avoid being wiped away over a period of use. Several surface antistats are essentially hygroscopic materials that cause a conductive film of water to form over a substrate. In this latter case, it is of course obvious that the resistivity of a given part will be dependent upon and change with the ambient humidity.

The other principal approach to the manufacture of ESD materials has been to fill a plastic with conductive materials like carbon black, metal fibers, carbon fibers, etc. This approach advantageously provides high conductivity, rapid static dissipation, reliability and permanence. Its disadvantages lie in the fact that the mechanical properties of the plastic materials may be adversely affected at the required loading levels. Some materials such as carbon black are of such black intensity that it is difficult to color the composite material. Also it should be noted, the reduction in strength attributable to the filler may cause portions of the surface to slough off. This is anathema to clean rooms and otherwise presents a surface that is never clean. Carbon blacks and particulate graphitic fillers are especially prone to sloughing.

Conductive fillers are also sometimes difficult to disperse uniformly throughout a plastic matrix. Lack of uniformity can create "hot spots" within a plastic matrix where arcing or damaging static discharge can occur. Some effective fillers like carbon fibers are relatively expensive while metal fibers cause excessive wear and abrasion to the flights of the screws in mixing extruders.

More recently, attention has been focused upon the use of synthetic organic materials as antistatic agents. These antistatic agents can range from low molecular weight compounds to comparatively high molecular weight compounds and polymeric materials.

Antistatic agents in the form of comparatively low molecular weight organic materials can be blended with the plastic by melt mixing. Typical examples would include quaternary ammonium salts, fatty acid esters and ethoxylated amines. Not uncommonly, however, low molecular weight electrostatic agents suffer from poor heat stability and, depending on the melting point of the base resin, they may not survive melt processing temperatures. Low molecular weight antistats, even when successfully incorporated into a molding powder can cause problems. Low molecular weight organic antistatic agents can migrate (bloom) to the surface of the molded article. Surface migration may impair the appearance and tactile properties of an article. Furthermore, most of these additives function by absorbing a layer of moisture on the surface of the article and so require a certain threshold of ambient humidity, below which they are ineffective.

It is known that some organic antistatic agents are thermally unstable or chemically incompatible with a polymer at processing temperatures and cause unacceptable degradation to or enter into unwanted side reactions with the host polymer. This is especially so with more complex host resins such as polyesters and polyamides.

Higher molecular weight organic and polymeric antistatic agents are available but here the miscibility of the antistatic agent with the base resins often becomes a problem. In addition to physical incompatibility (poor miscibility), thermal instability and chemical incompatibility may also cause problems.

There are even more difficult requirements imposed upon antistats in meeting special needs for a high temperature electrostatic dissipative material for use in applications such as wafer back-end testing in which chips are pressed against a fixture (nests, contactors and sockets) under elevated pressures and relatively high operating temperatures for plastics, such as 160° C. Electrostatic charges resulting from the movement of the equipment, the wafer itself or minute particles in the air surrounding the wafer can discharge suddenly and have significant and negative effects on the wafer.

As discussed generally above the requirements for an electrostatic dissipative plastics material fall in a specific range of resistivity. When the surface resistivity is less than about $10^6$ $\Omega/\square$, a composition has very little insulating ability and is generally considered a conductor. Such compositions are generally poor electrostatic dissipating polymeric materials because the speed of bleed off is too rapid and sparking or arcing can occur. A substrate with high conductivity does not offer protection from a destructive discharge as can result when the device is in the proximity of or contacts an electrically conductive element. In some applications the leads of a semiconductor device are in direct contact with the ESD test fixture during the test cycle. It follows that the surface resistivity must be high enough to avoid unwanted current flow between leads, but low enough to bleed off electrostatic charges in a controlled manner.

Summarizing, the surface resistivity of an electrostatic dissipative plastic should lie in a range of from about $10^6$ and $10^{12}$ and, when used, a conductive additive should have permanence, it should be not be affected by changes in the humidity and it should not slough off conductive particles. Also in the case of contact with devices having closely spaced leads, the electrostatic dissipative plastics should not be shorted out by a current being carried between two nearby leads (cross talk).

Early attempts to develop a product fitting these requirements (high compressive strength to at least 160° C. and the surface conductivity to bleed off the static) focused on the conventional approach of adding carbon black and organic antistats. It was found that carbon black sloughs and most commercial organic antistats are hygroscopic in their mode of action. Thus the latter are ineffective in low humidity environments. Few, if any, commercial organic antistats exhibit the thermal stability required for incorporation into and subsequent use of the high temperature plastics (dimensional stability at about 160° C. and above). Excellent thermal stability is especially necessary for processes such as stock shape extrusion or compression molding in which the blend may be held in the molten state for one hour or more.

Other attempts were made to form electrostatic dissipative plastics by adding carbon fibers at various concentrations. It was learned that the curve in which the resistivity is plotted vs. the concentration of the carbon fibers (sometimes referred to in the art as the percolation curve) is very steep in the region of desired surface resistivity. This means that a small change in the overall or local concentrations of carbon fibers can cause the surface resistivity to vary from too resistive to too conductive. Poor dispersion and variations in fiber orientation further contribute to the inability of obtaining consistent and reproducible values of resistivity. It has also been observed that even if a consistent surface resistivity is achieved by very careful blending of the carbon fibers in certain substrate, such as polyetheretherketone, the resistance drops quickly and irreversibly if the testing is carried out at voltages exceeding about 100 volts. It is thought that this happens because there is a dielectric breakdown of the thin sheath of polymer separating adjacent carbon fibers and also because carbonaceous material may be formed that provides conductive pathways.

It is also noted that many applications require that the resistivity of the ESD material is limited to a predefined one or two decade range within the overall $10^6$–$10^{12}$ ESD range. This was not found to be possible using additives such as standard or high performance carbon fibers, again due primarily to the steepness of the response curve. Therefore, prior to this invention, a material for making components with controlled resistivity (i.e. in a one or two decade range) for higher temperature (to 160° C.) applications has remained an unfulfilled need of the semiconductor industry.

The patent art has recognized that conductive carbonaceous materials in fibrous form can be used advantageously to adjust the surface resistivity of plastics. Reference is made, for example, to U.S. Pat. No. 5,068,061 which, inter alia, makes use of elongated non-linear non-flammable conductive carbonaceous fibers having reversible deflection ratios greater than 1.2:1 and aspect ratios greater than 10:1 to control the surface resistivity of plastics.

U.S. Pat. No. 5,820,788 is of interest since it teaches the utility of using chopped linear fibers of about 6 mils in length which have been partially carbonized to a carbon content of between about 70–85% by weight. The disclosed invention is adapted for the use in injection molding processes in which the filled resins are feed to the feed hopper in the form of chips approximately ¼ inch. The patent is also of interest for its discussion of other related prior art processes in which carbonaceous conductive materials are used to alter the conductivity of resins.

DISCLOSURE OF THE INVENTION

Accordingly it is an object of this invention to provide plastic materials that have surface resistivities in a range of from about $10^6$ to about $10^{12}$ $\Omega/\square$.

Another object of this invention is to provide plastic materials that have surface resistivities in the range of from about $10^{10}$ to about $10^{12}$ $\Omega/\square$.

Another object of this invention is to provide plastic materials that have surface resistivities in the range of from about $10^6$ to about $10^9$ $\Omega/\square$.

A further object of this invention to provide molding resins for use in compression molding processes plastic materials that can produce shaped articles which have surface resistivities that fall in a range of from about one to about two decades in the overall range of from about $10^6$ to about $10^{12}$ $\Omega/\square$.

A further object of the invention is to provide ESD materials made by compression molding processes that retain useful physical, chemical and electrical properties at temperatures of about 160° C. an d upward.

Another object of this invention is to provide effective methods means for predictably and consistently providing electrostatic dissipative plastics made by compression molding processes that have surface resistivities between that of a conductor and that of a insulator.

A related object of this invention is to provide electrostatic dissipative plastics with high temperature capabilities that have stable surfaces and do not slough off particles.

And yet a further object of this invention is to provide electrostatic dissipative plastics whose surface resistivity does not appreciably change with changes in temperature or humidity.

A still further object of this invention is to provide electrostatic dissipative plastics that substantially retain their initial surface resitivity after exposure to applied voltages in excess of about 100 volts.

BEST MEANS OF PRACTICING THE INVENTION

These and other objects of the invention are achieved by mixing between about 10 and 30 weight % of chopped partially carbonized fibers, i.e. fibers having a carbon content of between about 70 to 95% by weight and an average size of about 100 $\mu$m, with compression grade molding resins. Typically the compression grade molding resins are about 100 $\mu$m in size. When chopped carbon fibers of reduced conductivity are used the curve obtained by plotting the resistivity against the concentration of carbon fibers is less steep in the critical regions of interest (i.e., between about $10^{10}$ and $10^{12}$ and between about $10^6$ and $10^9$) than is the curve obtained when high conductivity fibers are used. It has been observed that even if some dielectric breakdown occurs, the connected fibers are not as conductive and the effect has been found not to be as significant as is the case with the usual carbon fibers which have maximized conductivity.

Since the invention is directed toward products made by compression processes, the chopped fiber of about 6 millimeters in length as taught by the prior art in preparing injection molding resins are of little or no utility since it is physically difficult to mix the fibers with the comparatively small compression molding resins of this invention. It has been found that when it is attempted to mix fibers in the range of about 6 millimeters with approximately 100 $\mu$m compression molding resins, the carbonaceous fibers tend to "ball up" and are difficult to impossible to disperse uniformly throughout the fibers with the compression molding resins.

Various blends were therefore made with PAI (polyamidimides), glass fibers (GF) and carbon fibers. Glass fibers were used to help reduce the coefficient of thermal expansion to provide better dimensional stability and mechanical properties of the components.

Additional tests were made by including reduced conductivity carbon fibers in other plastics including polyetherimides and polyethersulfones. By changing from the use of standard carbon fibers to reduced conductivity chopped fibers, it was possible to reproducibly establish materials with surface resistivities in the desired range. It is believed that these results are novel and have not been achieved by any other means for compression molding high temperature engineering thermoplastics.

Carbon fibers which were tested had carbonization of less than 100% and particularly carbon fibers in which the carbonization has proceeded from 85 to 95% proved to be particularly desirable.

What is claimed is:

1. A compression molding composition comprising a compression molding resin and partially carbonized fibers, wherein said fibers have an average size of about 100 $\mu$m and said resin is a particulate compression grade molding resin having an average particle size of about 100 $\mu$m.

2. A compression molding composition according to claim 1, wherein said partially carbonized fibers comprise from about 70% to about 95% by weight of carbon.

3. A compression molding composition according to claim 1, wherein said partially carbonized fibers are present in the amount from about 10% to about 30% by weight.

4. A compression molding composition according to claim 1, wherein said resin is a thermoplastic resin.

5. A compression molding composition according to claim 3, wherein said resin is selected from the group consisting of polyphenylenesulphides, polyamideimides, polyetheretherketones, polytertafluoroethylene, polyetherimides, and polyethersulfones.

6. A compression molding composition according to claim 1 further comprising glass fibers.

7. An article of manufacture obtained by compression molding a resin composition according to claim 1, wherein said article has a surface resistivity from about $10^6$ to about $10^{12}$ $\Omega/\square$.

8. An article of manufacture obtained by compression molding a resin composition according to claim 1, wherein said article has a surface resistivity from about $10^{10}$ to about $10^{12}$ $\Omega/\square$.

9. An article of manufacture obtained by compression molding a resin composition according to claim 1, wherein said article has a surface resistivity from about $10^6$ to about $10^9$ $\Omega/\square$.

10. An article of manufacture obtained by compression molding a resin composition according to claim 1, wherein said article has a surface resistivity within about one to about two orders of magnitude and said resistivity is in the range from about $10^6$ to about $10^{12}$ $\Omega/\square$.

11. An article of manufacture according to claim 1, wherein said article exhibits stable surface resistivity at a temperature of at least 160° C.

12. A article according to claim 11, wherein said article has a surface resistivity from about $10^6$ to about $10^{12}$ $\Omega/\square$.

13. An article of manufacture obtained by compression molding a resin composition according to claim 1, wherein said article substantially retains its initial surface resistivity after exposure to applied voltage in excess of about 100 volts.

14. A process for producing a shaped article comprising compression molding a resin composition according to claim 1 into a desired shape.

15. A process for producing a compression molding composition comprising mixing partially carbonized fibers having a particle size of about 100 $\mu$m and a particulate compression grade molding resin having an average particle size of about 100 $\mu$m.

* * * * *